(12) United States Patent
Tsai et al.

(10) Patent No.: US 8,749,472 B2
(45) Date of Patent: Jun. 10, 2014

(54) LED DRIVING SYSTEM SUPPORTING 2D MODE AND 3D MODE AND DISPLAY DEVICE USING THE SAME

(75) Inventors: Cheng-Hung Tsai, Jhongli (TW); Chin-Po Cheng, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 243 days.

(21) Appl. No.: 13/283,606

(22) Filed: Oct. 28, 2011

(65) Prior Publication Data

US 2012/0320023 A1    Dec. 20, 2012

(30) Foreign Application Priority Data

Jun. 20, 2011    (TW) .............................. 100121350 A (51) Int. Cl.
G09G 3/36    (2006.01)
G06F 3/038    (2013.01)
G09G 5/00    (2006.01)

(52) U.S. Cl.
USPC ............ 345/102; 345/204; 345/212; 345/419

(58) Field of Classification Search
CPC .................................................. G09G 3/3406

USPC .................................. 345/212, 102; 315/210
See application file for complete search history.

(56) References Cited

U.S. PATENT DOCUMENTS

| | | | | |
|---|---|---|---|---|
| 3,920,928 | A * | 11/1975 | Lye ............................... | 379/163 |
| 4,649,458 | A * | 3/1987 | Arai et al. ...................... | 361/152 |
| 7,813,150 | B2 | 10/2010 | Cuadra et al. | |
| 2010/0289424 | A1 | 11/2010 | Change et al. | |
| 2010/0301762 | A1* | 12/2010 | Kung et al. .................... | 315/193 |
| 2011/0089860 | A1 | 4/2011 | Kuo et al. | |
| 2011/0115889 | A1* | 5/2011 | Kim et al. ....................... | 348/56 |
| 2011/0273480 | A1* | 11/2011 | Park et al. ...................... | 345/690 |

* cited by examiner

*Primary Examiner* — Joe H Cheng
*Assistant Examiner* — Hang Lin
(74) *Attorney, Agent, or Firm* — Novak Druce Connolly Bove + Quigg LLP (57) ABSTRACT

A light emitting diode (LED) driving system driving a LED array of a display device includes a converter circuit, a pulse width modulator (PWM) controller, a 2D parameter circuit, a 3D parameter circuit and a microcontroller. The 3D parameter circuit outputs 3D parameter control signals when the display device is in a 3D mode, and stops from generating the 3D parameter control signals when the display device is in a 2D mode. The PWM controller outputs PWM signals to control the converter circuit according to outputs of the 2D parameter circuit and the 3D parameter circuit.

18 Claims, 7 Drawing Sheets

LED DRIVING SYSTEM SUPPORTING 2D MODE AND 3D MODE AND DISPLAY DEVICE USING THE SAME

BACKGROUND

1. Technical Field

The disclosure relates to display devices, and particularly to a light emitting diode driving system of a display device.

2. Description of Related Art

Three dimension (3D) light emitting diode (LED) televisions (TV) are becoming popular. Because the LED TV in a 3D mode needs higher brightness than that in a two dimension (2D) mode, LEDs, acting as backlight of the LED TV, need much more current and voltage in the 3D mode than in the 2D mode. In other words, load characteristics of the LED driving system are different in the 2D mode and the 3D mode, which causes difficulty in designing the LED driving system.

DETAILED DESCRIPTION

Figure 1:
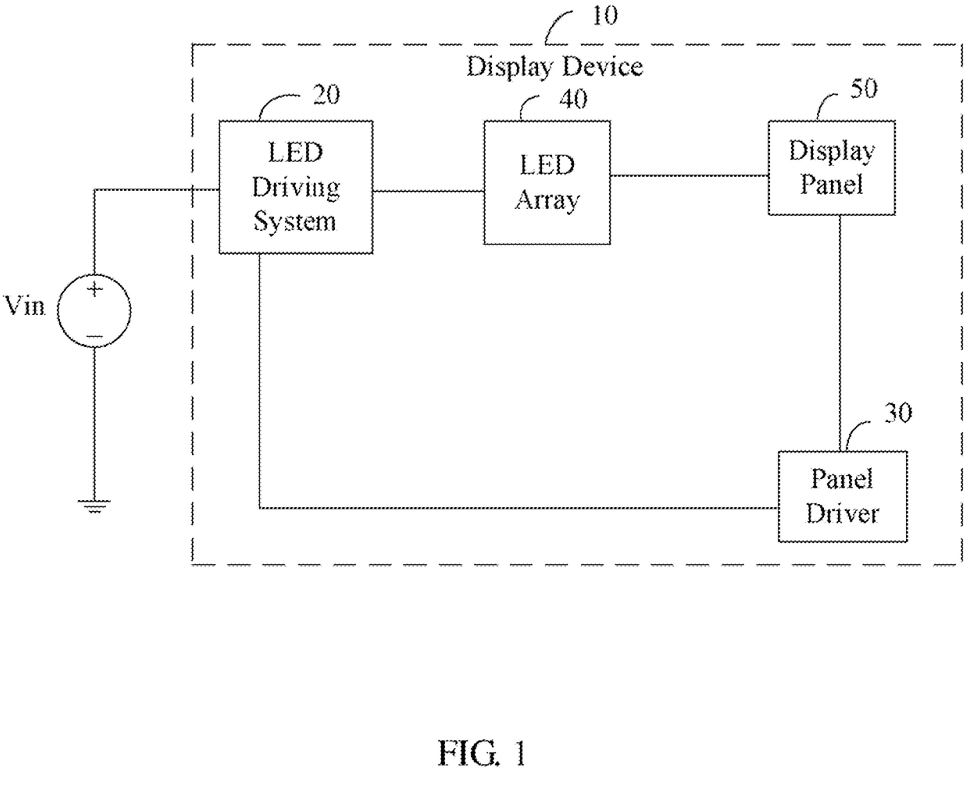
FIG. 1 is a schematic diagram of one embodiment of a display device as disclosed.

FIG. 1 is a schematic diagram of one embodiment of a display device 10 as disclosed. In the embodiment, the display device 10 comprises a light emitting diode (LED) driving system 20, a panel driver 30, a LED array 40, and a display panel 50. The display device 10 is configured to display either in a two dimension (2D) mode or in a three dimension (3D) mode. The panel driver 30 drives the display panel 50 to display video content in the 2D mode or the 3D mode, generates a first logic notification signal, such as logic low voltage signal (0), to the LED driving system 20 when the display panel 50 is in the 2D mode, and generates a second logic notification signal, such as logic high voltage signal (1), to the LED driving system 20 when the display panel 50 is in the 3D mode.

The LED driving system 20 converts direct current power Vin into voltage suitable to drive the LED array 40 to light the display panel 50, and adjusts the voltage output to the LED array 40 according to the first or second logic notification signal to adjust brightness of the LED array 40 to satisfy different brightness needs of the display panel 50. In the embodiment, the LED driving system 20 receives the second logic notification signal, such as logic high voltage signal, and subsequently outputs high voltage, such as 5 volt (V), to the LED array 40 to increase the brightness of the LED array 40 when the display panel 50 is in the 3D mode. The LED driving system 20 receives the first logic notification signal, such as logic low voltage signal, and subsequently outputs low voltage, such as 2V, to the LED array 40 to lower the brightness of the LED array 40 when the display panel 50 is in the 2D mode.

Figure 2:
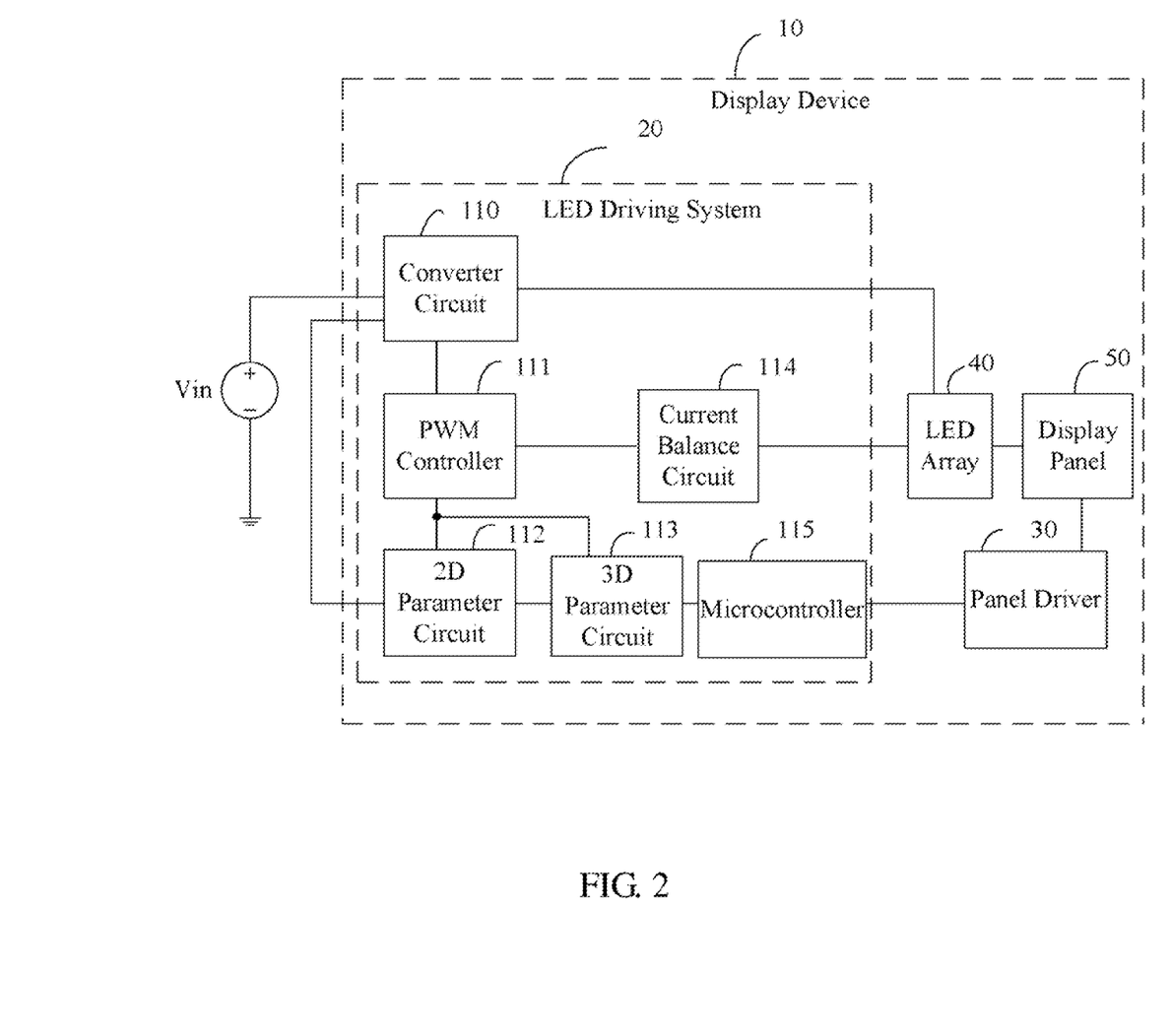
FIG. 2 is a schematic diagram of one embodiment of a LED driving system as disclosed.

FIG. 2 is a schematic diagram of one embodiment of the LED driving system 20. In the embodiment, the LED driving system 20 comprises a converter circuit 110, a pulse width modulator (PWM) controller 111, a 2D parameter circuit 112, a 3D parameter circuit 113, a current balance circuit 114 and a microcontroller 115. In the embodiment, the LED array 40 comprises a plurality of LED strings connected in parallel, and each of the LED strings comprises a plurality of LEDs connected in series forwardly. An anode of the LED array 40 is an anode of the first LED of the LED strings, and a cathode of the LED array 40 is a cathode of the last LED of the LED strings. The panel driver 30 drives the display panel 50 to display the video content in the 2D mode or in the 3D mode selectively, and generates different notification signals according to the display device 10 being in the 2D mode or the 3D mode. The microcontroller 115 is connected to the panel driver 30 to receive the notification signals, and either generates and outputs a first signal when the notification signal is the second logic notification signal, or generates and outputs a second signal when the notification signal is the first logic notification signal. The first signal is a 3D micro-control signal, and the second signal is a 2D micro-control signal. In the embodiment, for example, the 3D micro-control signal is logic 1, and the 2D micro-control signal is logic 0. In another embodiment, the 3D micro-control signal is logic 0, and the 2D micro-control signal is logic 1.

The 3D parameter circuit 113 is connected to the microcontroller 115 to generate a 3D parameter control signal upon receiving the 3D micro-control signal, and to stop generating the 3D parameter control signal upon receiving the 2D micro-control signal. The 2D parameter circuit 112 is connected to the 3D parameter circuit 113, and generates a 2D parameter control signal according to output of the 3D parameter circuit 113. The PWM controller 111 determines frequency parameter, current detection parameter and compensation parameter according to the outputs of the 2D parameter circuit 112 and the 3D parameter circuit 113 to generate corresponding PWM signals to control the converter circuit 110. The converter circuit 110 is connected to the direct current power Vin, the 2D parameter circuit 112 and the anode of the LED array 40 to convert the direct current power Vin to the voltage suitable to drive the LED array 40 under control of the PWM signals. The current balance circuit 114 is connected to the PWM controller 111 and the cathode of the LED array 40 to balance the current flowing through the LED array 40.

Figure 3:
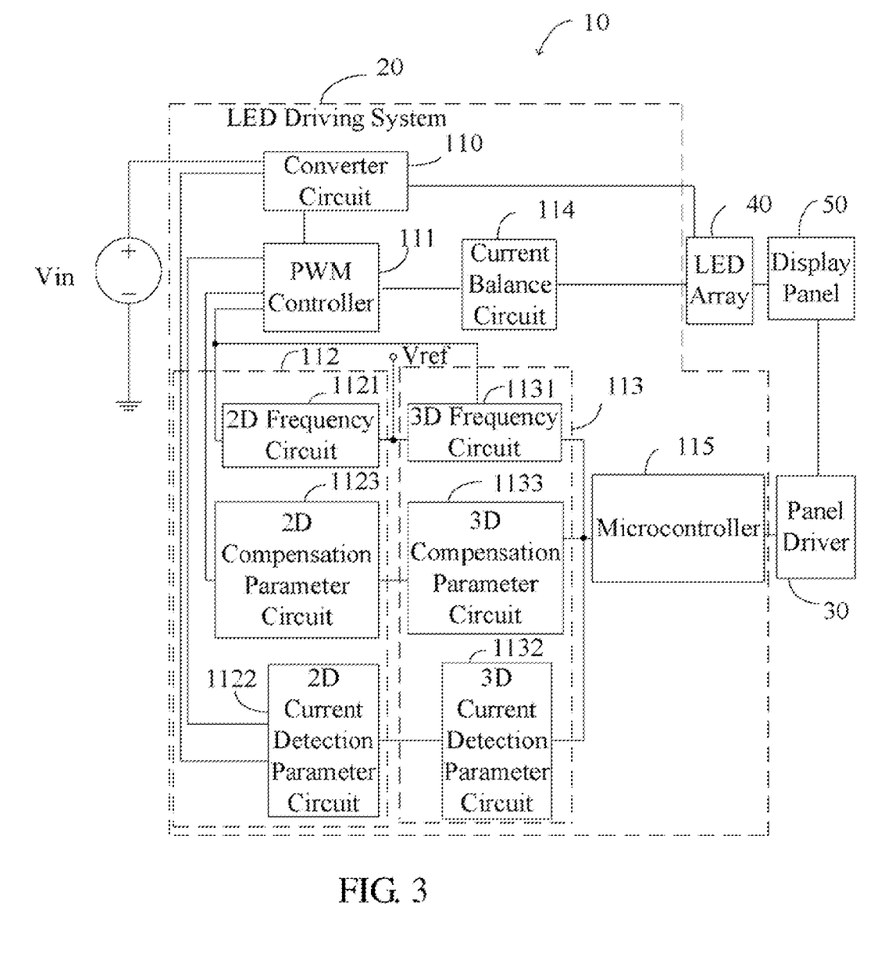
FIG. 3 is a schematic diagram of one embodiment of a 2D parameter circuit and a 3D parameter circuit of a LED driving system as disclosed.

FIG. 3 is a schematic diagram of one embodiment of the 2D parameter circuit 112 and the 3D parameter circuit 113 of the LED driving system 20. The 2D parameter circuit 112 comprises a 2D frequency parameter circuit 1121, a 2D current detection parameter circuit 1122, and a 2D compensation parameter circuit 1123. The 3D parameter circuit 113 comprises a 3D frequency parameter circuit 1131, a 3D current detection parameter circuit 1132 and a 3D compensation parameter circuit 1133. The 3D frequency parameter circuit 1131 receives the 2D micro-control signal or the 3D micro-control signal from the microcontroller 115, and generates and outputs a 3D frequency parameter control signal to the PWM controller 111. In response to the 3D frequency parameter control signal, duty cycle of the PWM signals generated by the PWM controller 111 is changed, which subsequently changes output of the converter circuit 110 when the display device 10 is in the 3D mode. The 3D frequency parameter circuit 1131 stops from generating and outputting the 3D frequency parameter control signal to the PWM controller 111 when the display device 10 is in the 2D mode.

The 3D current detection parameter circuit 1132 is connected to the microcontroller 115 and the 2D current detection parameter circuit 1122, to receive the 2D micro-control signal or the 3D micro-control signal. Upon receiving the 3D micro-control signal, the 3D current detection parameter circuit 1132 outputs a 3D current detection parameter control signal to the 2D current detection parameter circuit 1122, so as to change the current detection parameter of the PWM controller 111. Subsequently, the duty cycle of the PWM signals generated by the PWM controller 111 is changed, and correspondingly changes the output of the converter circuit 110. Upon receiving the 2D micro-control signal, the 3D current detection parameter circuit 1132 stops from generating the 3D current detection parameter control signal to the 2D current detection parameter circuit 1122, the display device 10 is in the 2D mode.

The 3D compensation parameter circuit 1133 is connected to the microcontroller 115 and the 2D compensation parameter circuit 1123, to receive the 2D micro-control signal or the 3D micro-control signal. Upon receiving the 3D micro-control signal, the 3D compensation parameter circuit 1133 outputs a 3D compensation parameter control signal to the 2D compensation parameter circuit 1123, so as to change the compensation parameter of the PWM controller 111. Subsequently, the duty cycle of the PWM controller 111 is changed, which correspondingly changes the output of the converter circuit 110. Upon receiving the 2D micro-control signal, the 3D compensation parameter circuit 1133 stops from generating the 3D compensation parameter control signal to the 2D compensation parameter circuit 1123, the display device 10 is in the 2D mode.

In another embodiment, the 2D parameter circuit 112 and the 3D parameter circuit 113 comprise any groups of the 2D frequency parameter circuit 1121 and the 3D frequency parameter circuit 1131, the 2D current detection parameter circuit 1122 and the 3D current detect circuit 1132, and the 2D compensation parameter circuit 1123 and the 3D compensation parameter circuit 1133.

Figure 4:
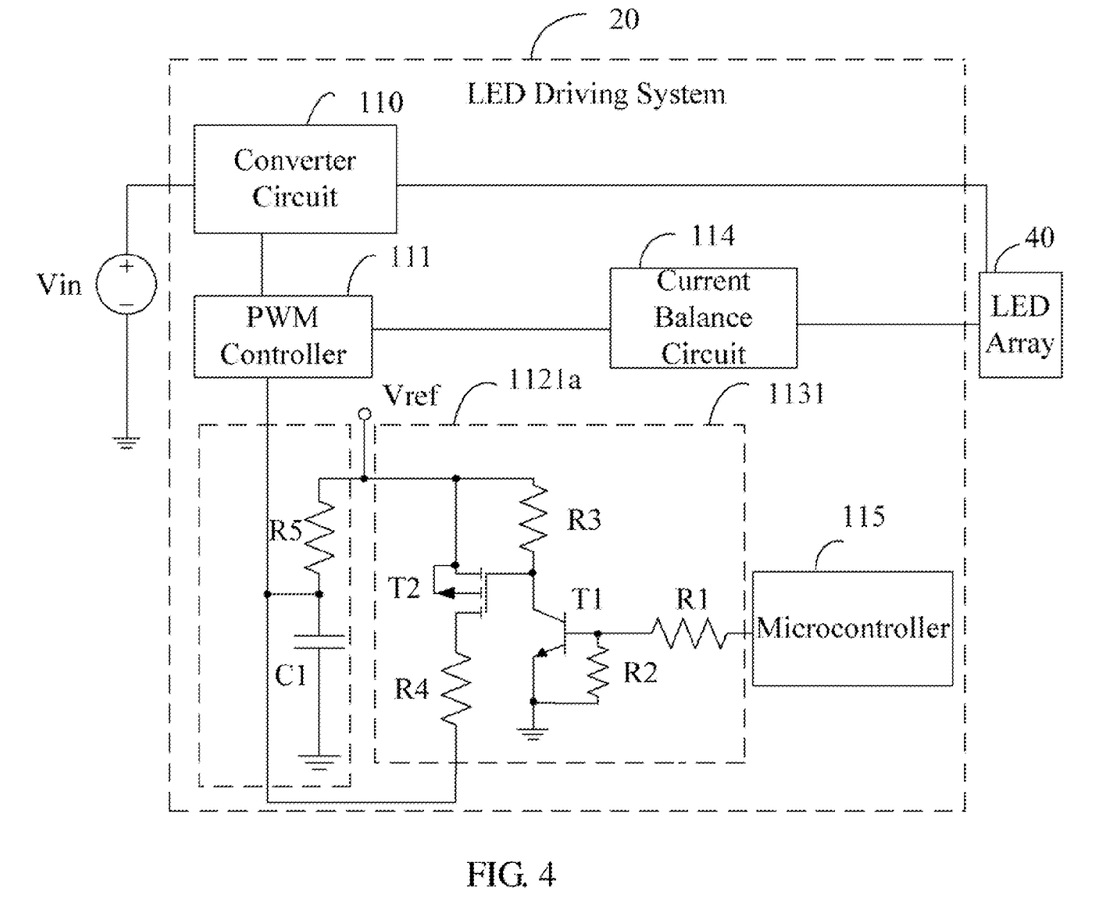
FIG. 4 illustrates detailed circuits of one embodiment of a 2D frequency parameter circuit and a 3D frequency parameter circuit of a LED driving system as disclosed.

FIG. 4 illustrates detailed circuits of one embodiment of a 2D frequency parameter circuit 1121a and the 3D frequency parameter circuit 1131 of the LED driving system 20. In the embodiment, the 3D frequency parameter circuit 1131 comprises a first resistor R1, a second resistor R2, a first transistor T1 comprising a first pole, a second pole and a third pole, a third resistor R3, a second transistor T2 comprising a first pole, a second pole and a third pole, and a fourth resistor R4.

In the embodiment, the first pole of the first transistor T1 is connected to the microcontroller 115 via the first resistor R1 and connected to the ground via the second resistor R2, the second pole of the first transistor T1 is connected to the ground, and the third pole of the first transistor T1 is connected to a reference voltage power Vref via the third resistor R3. The first pole of the second transistor T2 is connected to the third pole of the first transistor T1, the second pole of the second transistor T2 is connected to the reference voltage power Vref, and the third pole of the second transistor T2 is connected to the PWM controller 111 via the fourth resistor R4.

In the embodiment, the first transistor T1 is a NPN type transistor. The first pole of the first transistor T1 is a base of the NPN type transistor, the second pole of the first transistor T1 is an emitter of the NPN type transistor, and the third pole of the first transistor T1 is a collector of the NPN type transistor. The second transistor T2 is P type metal-oxide semiconductor field effect transistor (PMOSFET). The first pole of the second transistor T2 is a gate of the PMOSFET, the second pole of the second transistor T2 is a source of the PMOSFET, and the third pole of the second transistor T2 is a drain of the PMOSFET.

In the embodiment, the 2D frequency parameter circuit 1121a comprises a fifth resistor R5 and a first capacitor C1 connected in series between the reference voltage power Vref and the ground. The first capacitor C1 and the fifth resistor R5 form a RC circuit, which is for filtering. A junction of the fifth resistor R5 and the first capacitor C1 and the fourth resistor R4 is connected to the PWM controller 111.

In the embodiment, the PWM controller 111 is FP3843 microchip comprising an oscillation pin, a compensation pin and a current detect pin. The fourth resistor R4 and the fifth resistor R5 are both connected to the oscillation pin.

In the embodiment, the microcontroller 115 generates the 2D micro-control signal to the first resistor R1 when the display device 10 is in the 2D mode, and then voltage of the base and the emitter of the first transistor T1 are equal, the first transistor T1 is off and voltage of the collector of the first transistor T1 is high such as 5V. In other word, voltage of the gate and the source of the second transistor T2 are equal, so the second transistor T2 is also off. The reference voltage power Vref is connected to the PWM controller 111 via the fifth resistor R5, and the PWM controller 111 generates the PWM signal with small duty cycle, which results in the converter 110 outputting lower voltage to maintain lower luminance of the LED array 40.

The microcontroller 115 generates the 3D micro-control signal to the first resistor R1 when the display device is in the 3D mode, and then voltage of the base of the first transistor T1 is higher than the emitter of the first transistor T1, the first transistor T1 is turned on and the voltage of the collector of the first transistor T1 is low such as 0.8V. In other word, the voltage of the gate of the second transistor T2 is lower than the source of the second transistor T2, so the second transistor T2 is turned on. The reference voltage power Vref is connected to the PWM controller 111 via the fourth resistor R4 and the fifth resistor R5 connected in parallel. Because total resistance of the fourth resistor R4 and the fifth resistor R5 connected in parallel is smaller than that of the fifth resistor R5, the duty cycle of the PWM signal generated by the PWM controller 111 when the display device 10 is in the 3D mode is bigger than the duty cycle of the PWM signal generated by the PWM controller 111 when the display device 10 is in the 2D mode, which causes the converter 110 to output higher voltage when the display device 10 is in the 3D mode to satisfy higher brightness need of the LED array 40.

Figure 5:
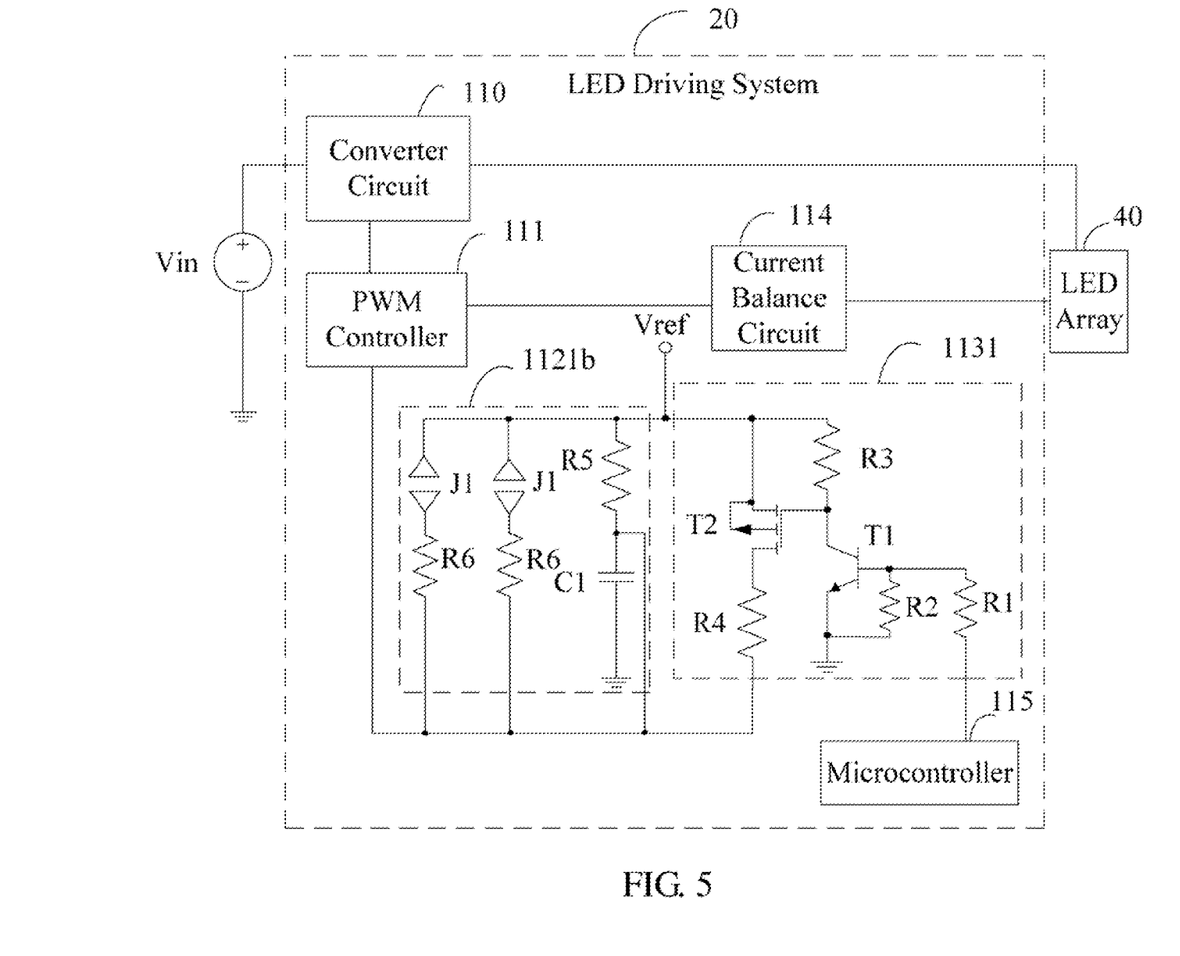
FIG. 5 is a circuit diagram of an alternative embodiment of a 2D frequency parameter circuit and a 3D frequency parameter circuit of a LED driving system as disclosed.

FIG. 5 is a circuit diagram of an alternative embodiment of the 2D frequency parameter circuit 1121b and the 3D frequency parameter circuit 1131 of the LED driving system 20. In the embodiment, the 2D frequency parameter circuit 1121b is similar to the 2D frequency parameter circuit 1121a of FIG. 4 except that the 2D frequency parameter circuit 1121b further comprises at least one sixth resistor R6 and at least one solder pad J1 connected in series between the reference voltage power Vref and the junction of the fourth resistor R4 and the PWM controller 111. In the embodiment, the numbers of the sixth resistor R6 and the solder pad J1 are both two, and series circuit comprising the sixth resistor R6 and the solder pad J1 and another series circuit comprising the other sixth resistor R6 and the other solder pad J1 are connected in parallel.

In the embodiment, the solder pad J1 separates the sixth resistor R6 from the reference voltage power Vref. In specific applications, user can make the solder pad J1 conduct to change the duty cycle of the PWM signal, thus the PWM controller 111 became more adjustable.

Figure 6:
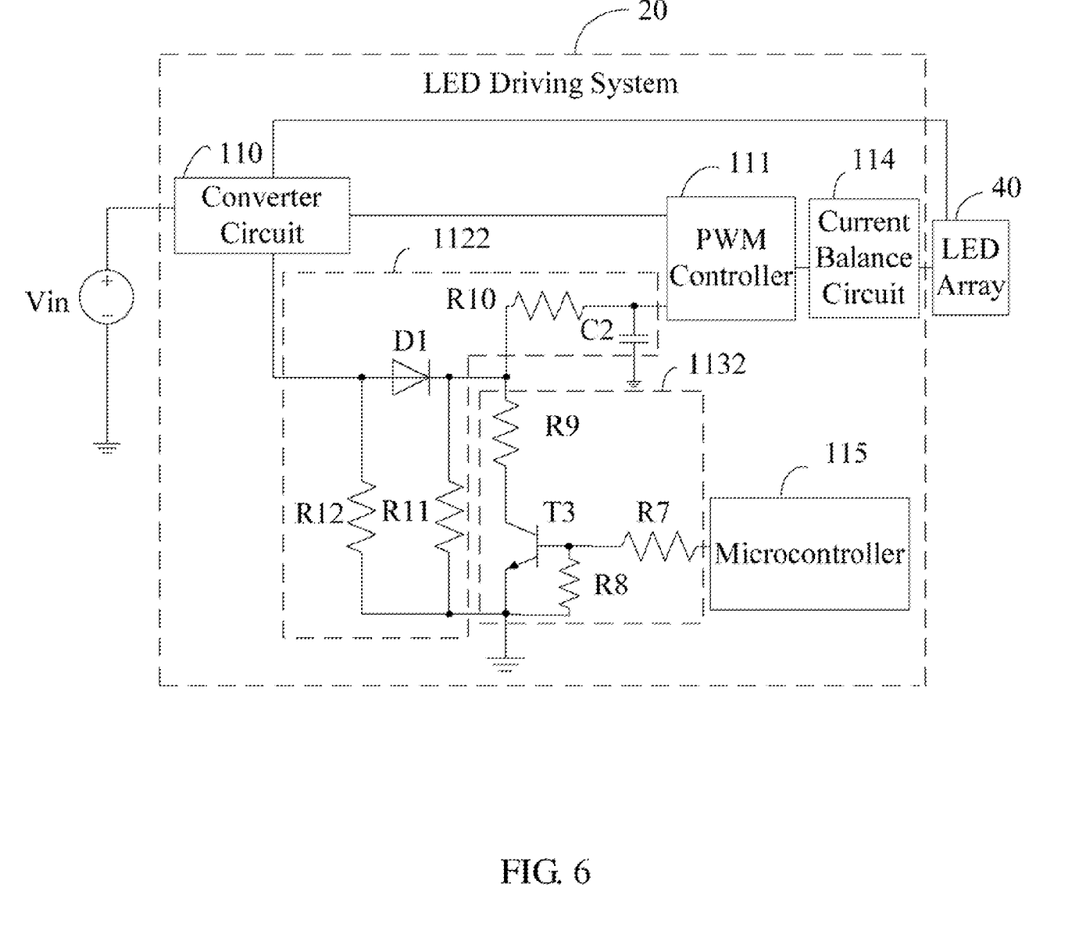
FIG. 6 is a circuit diagram of one embodiment of a 2D current detection parameter circuit and a 3D current detection parameter circuit of a LED driving system as disclosed.

FIG. 6 is a circuit diagram of one embodiment of the 2D current detection parameter circuit 1122 and the 3D current detection parameter circuit 1132 of the LED driving system 20. In the embodiment, the 3D current detection parameter 1132 comprises a seventh resistor R7, an eighth resistor R8, a third transistor T3 and a ninth resistor R9. The third transistor T3 comprises a first pole, a second pole and a third pole grounded. The seventh resistor R7 is connected between the microcontroller 115 and the second pole of the third transistor T3. The eighth resistor R8 is connected between the second pole of the third transistor T3 and the ground. One end of the ninth resistor R9 is connected to the first pole of the third transistor T3.

In the embodiment, the 2D current detection parameter circuit 1122 comprises a tenth resistor R10, a second capacitor C2, an eleventh resistor R11, a first diode D1 and a twelfth resistor R12. An anode of the first diode D1 is connected to the converter 110 and a cathode of the first diode D1 is connected to the other end of the ninth resistor R9. The tenth resistor R10 is connected between the PWM controller 111 and the other end of the ninth resistor R9. The second capacitor C2 is connected between junction of the tenth resistor R10 and the PWM controller 111 and the ground. The second capacitor C2 and the tenth resistor R10 form a RC circuit, which is for filtering. The eleventh resistor R11 is connected between the cathode of the first diode D1 and the ground. The twelfth resistor R12 is connected between the anode of the first diode and the ground.

In the embodiment, the third transistor T3 is a NPN type transistor. The first pole of the third transistor T3 is a collector of the NPN type transistor, the second pole of the third transistor T3 is a base of the NPN type transistor and the third pole of the third transistor T3 is an emitter of the NPN type transistor. In the embodiment, the PWM controller 111 is FP3843 microchip comprising an oscillation pin, a compensation pin and a current detect pin. The junction of the tenth resistor R10 and the second capacitor C2 is connected to the current detect pin.

Working principle of the embodiment is similar to the working principle of the 2D frequency parameter circuit 1121a and the 3D frequency parameter circuit 1131 of the LED driving system 20 of the FIG. 4. The working principle is that the microcontroller 115 outputs the 2D micro-control signal when the display device 10 is in the 2D mode, and outputs the 3D micro-control signal when the display device 10 is in the 3D mode, to control the third transistor T3 turn on or off to control the duty cycle of the PWM signals, and then to change the output of the converter 110 to satisfy different brightness need of the LED array 40 when the display device 10 is in the 2D mode or in the 3D mode.

Figure 7:
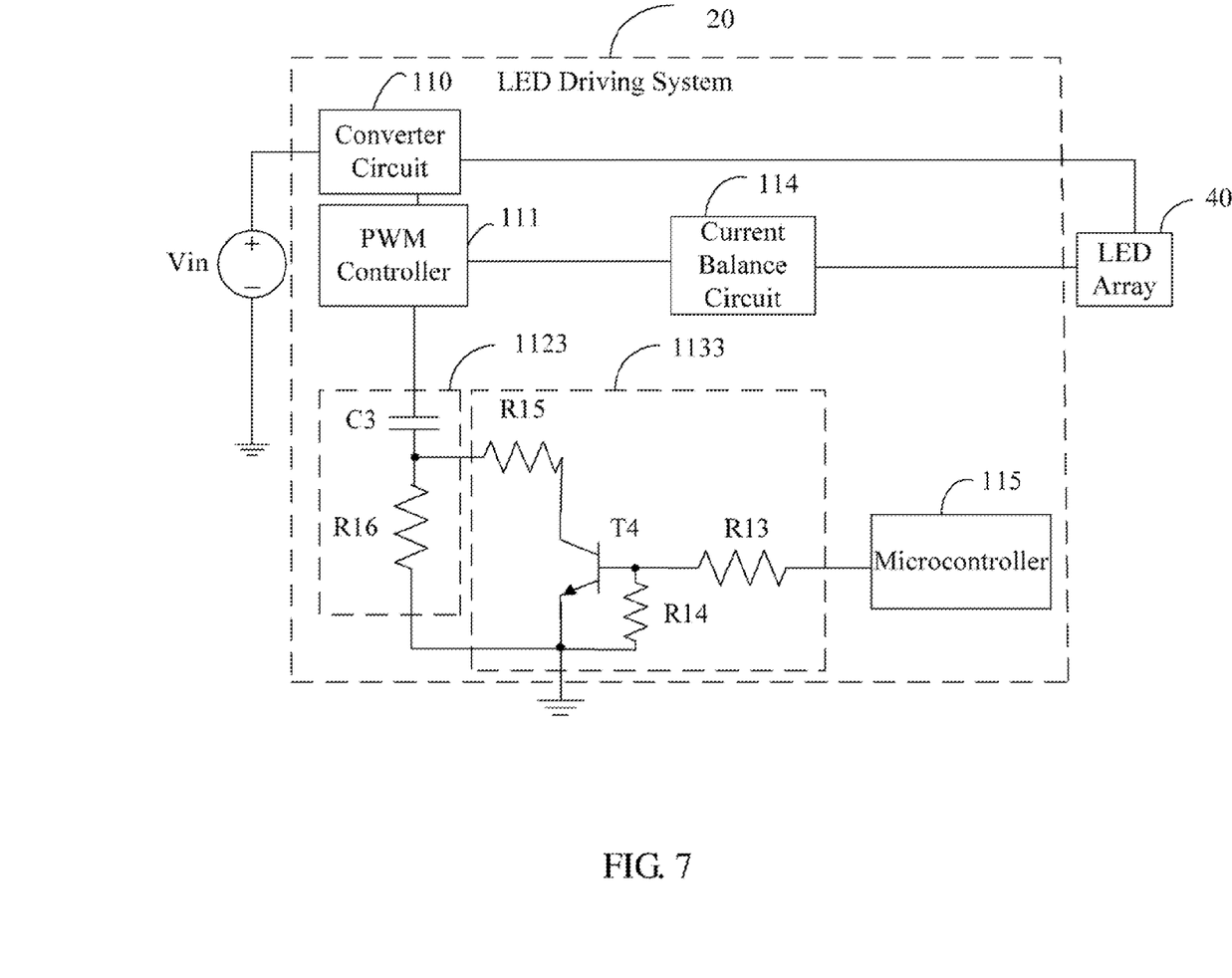
FIG. 7 is a circuit diagram of one embodiment of a 2D compensation parameter circuit and a 3D compensation parameter circuit of a LED driving system as disclosed.

FIG. 7 is a circuit diagram of one embodiment of the 2D compensation parameter circuit 1123 and the 3D compensation parameter circuit 1133 of the LED driving system 20. In the embodiment, the 3D compensation parameter circuit 1133 comprises a thirteenth resistor R13, and a fourteenth resistor R14, a fourth transistor T4 and a fifteenth resistor R15. The fourth transistor T4 comprises a first pole, a second pole and a third pole grounded. The thirteenth resistor R13 is connected between the microcontroller 115 and the second pole of the fourth transistor T4. The fourteenth resistor R14 is connected between the second pole of the fourth transistor T4 and the ground. One end of the fifteenth resistor R15 is connected to the first pole of the fourth transistor T4.

In the embodiment, the 2D compensation parameter circuit 1123 comprises a third capacitor C3 and a sixteenth resistor R16. The third capacitor C3 is connected between the PWM controller 111 and the other end of the fifteenth resistor R15. The sixteenth resistor R16 is connected between the other end of the fifteenth resistor R15 and the ground. The third capacitor C3 and the sixteenth resistor R16 form a RC circuit, which is for filtering.

In the embodiment, the fourth transistor T4 is a NPN type transistor. The first pole of the fourth transistor T4 is a collector of the NPN type transistor, the second pole of the fourth transistor T4 is a base of the NPN type transistor, and the third pole of the fourth transistor T4 is an emitter of the NPN type transistor. In the embodiment, the PWM controller 111 is the FP3843 microchip comprising the oscillation pin, the compensation pin and the current detect pin. A junction of the fifteenth resistor R15 and the sixteenth resistor R16 is connected to the compensation pin.

The working principle of the embodiment is similar to the working principle of the 2D frequency parameter circuit 1121a and the 3D frequency parameter circuit 1131 of the LED driving system 20 of FIG. 4. The working principle is that the microcontroller 115 outputs the 2D micro-control signal or the 3D micro-control signal to control the fourth transistor T4 turn on or off, to control the duty cycle of the PWM signals, and then to change the output of the converter 110 to satisfy different brightness need of the LED array 40 when the display device 10 is in different modes.

The LED driving system 20 controls the 3D parameter circuit 113 whether to output the 3D parameter control signal according to the different modes of the display panel 50 to control the duty cycle of the PWM signals to change the output of the converter 110, and then to satisfy needs of the LED array 40 in the different modes. Thus, the LED driving system 20 is flexible and has high stability.

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A light emitting diode (LED) driving system, to drive an LED array of a display device comprising a display panel and a panel driver, the LED driving system comprising:
   a microcontroller, connected to the panel driver to output a first signal when the display device is in a 3D mode, and to output a second signal when the display device is in a two dimension (2D) mode;
   a pulse width modulator (PWM) controller comprising an oscillation pin, a compensation pin and a current detect pin;
   a 3D parameter circuit comprising:
      a 3D frequency parameter circuit, connected to the microcontroller and the oscillation pin of the PWM controller, the 3D frequency parameter circuit outputting a 3D frequency parameter control signal upon receiving the first signal, and stopping outputting the 3D frequency parameter control signal upon receiving the second signal;
      a 3D current detection parameter circuit, connected to the microcontroller, the 3D current detection parameter circuit outputting a 3D current detection parameter control signal upon receiving the first signal, and stopping outputting the 3D current detection parameter control signal upon receiving the second signal; and a 3D compensation parameter circuit, connected to the microcontroller, the 3D compensation parameter circuit outputting a 3D compensation parameter control signal upon receiving the first signal, and stopping outputting the 3D compensation parameter control signal upon receiving the second signal;

a 2D parameter circuit generating and outputting a 2D parameter control signal according to output of the 3D frequency parameter circuit, the 3D current detection parameter circuit and the 3D compensation parameter circuit, the 2D parameter circuit comprising:

a 2D frequency parameter circuit, connected to the 3D frequency parameter circuit and the oscillation pin of the PWM controller;

a 2D current detection parameter circuit, connected to the 3D current detection parameter circuit and the current detect pin of the PWM controller; and a 2D compensation parameter circuit, connected to the 3D compensation parameter circuit and the compensation pin of the PWM controller; and a converter, connected to a direct current power, the PWM controller, the 2D parameter circuit and an anode of the LED array, to convert the direct current power into voltage suitable to drive the LED array under control of PWM signals;

wherein the PWM controller outputs the PWM signals according to inputs of the oscillation pin, the compensation pin and the current detect pin;

wherein the 3D frequency parameter circuit comprises:
a first resistor, having one end connected to the microcontroller;
a second resistor, connected between the other end of the first resistor and ground;
a first transistor, comprising a base connected to the other end of the first resistor, an emitter connected to the ground, and a collector;
a third resistor, connected between a reference voltage power and the collector of the first transistor;
a second transistor, comprising a gate connected to the collector of the first transistor, a source connected to the reference voltage power, and a drain; and
a fourth resistor, having one end connected to the drain of the second transistor and the other end connected to the PWM controller.

2. The LED driving system of claim 1, wherein the LED driving system further comprises a current balance circuit connected to the PWM controller and a cathode of the LED array to balance current flowing through the LED array.

3. The LED driving system of claim 1, wherein the 2D frequency parameter circuit comprises:
a fifth resistor, having one end connected to the reference voltage power and the other end connected to PWM controller together with the other end of the fourth resistor; and
a first capacitor, connected between the other end of the fifth resistor and the ground.

4. The LED driving system of claim 3, wherein the 2D frequency parameter circuit further comprises:
at least one sixth resistor, having one end connected to the PWM controller together with the other end of the fourth resistor; and
at least one solder pad, connected between the reference voltage power and the other end of the sixth resistor.

5. The LED driving system of claim 1, wherein the 3D current detection parameter circuit comprises:
a seventh resistor, having one end connected to the microcontroller;
an eighth resistor, connected between the other end of the seventh resistor and the ground;
a third transistor, comprising a collector, a base connected to the other end of the seventh resistor, and an emitter grounded; and
a ninth resistor, having one end connected to the collector of the third transistor.

6. The LED driving system of claim 5, wherein the 2D current detection parameter circuit comprises:
a tenth resistor, connected between the other end of the ninth resistor and the PWM controller;
a second capacitor, connected between a junction of the tenth resistor and the PWM controller and the ground;
an eleventh resistor, having one end grounded and the other end connected to the other end of the ninth resistor;
a twelfth resistor, having one end grounded and the other end connected to the converter; and
a first diode, having a cathode connected to the other end of the eleventh resistor, and an anode connected to the other end of the twelfth resistor.

7. The LED driving system of claim 1, wherein the 3D compensation parameter circuit comprises:
a thirteenth resistor, having one end connected to the microcontroller;
a fourteenth resistor, connected between the other end of the thirteenth resistor and the ground;
a fourth transistor, comprising a collector, a base connected to the other end of the thirteenth resistor, and an emitter grounded; and
a fifteenth resistor, having one end connected to the collector of the fourth transistor.

8. The LED driving system of claim 7, wherein the 2D compensation parameter circuit comprises:
a third capacitor, having one end connected to the PWM controller and the other end connected to the other end of the fifteenth resistor; and
a sixteenth resistor, connected between the other end of the third capacitor and the ground.

9. A display device, comprising:
a display panel capable of display in a two dimension (2D) mode or a three dimension (3D) mode;
a panel driver, to drive the display panel to display video content in the 2D mode or the 3D mode;
a light emitting diode (LED) array; and
an LED driving system, to drive the LED array, the LED driving system comprising:
a microcontroller, connected to the panel driver to output a first signal when the display device is in the 3D mode, and to output a second signal when the display device is in the 2D mode;
a pulse width modulator (PWM) controller comprising an oscillation pin, a compensation pin and a current detect pin;
a 3D parameter circuit comprising:
a 3D frequency parameter circuit, connected to the microcontroller and the oscillation pin of the PWM controller, the 3D frequency parameter circuit outputting a 3D frequency parameter control signal upon receiving the first signal, and stopping outputting the 3D frequency parameter control signal upon receiving the second signal;
a 3D current detection parameter circuit, connected to the microcontroller, the 3D current detection parameter circuit outputting a 3D current detection parameter control signal upon receiving the first signal, and stopping outputting the 3D current detection parameter control signal upon receiving the second signal; and a 3D compensation parameter circuit, connected to the microcontroller, the 3D compensation parameter circuit outputting a 3D compensation parameter control signal upon receiving the first signal, and stopping outputting the 3D compensation parameter control signal upon receiving the second signal;

a 2D parameter circuit generating and outputting a 2D parameter control signal according to output of the 3D frequency parameter circuit, the 3D current detection parameter circuit and the 3D compensation parameter circuit, the 2D parameter circuit comprising:

a 2D frequency parameter circuit, connected to the 3D frequency parameter circuit and the oscillation pin of the PWM controller;

a 2D current detection parameter circuit, connected to the 3D current detection parameter circuit and the current detect pin of the PWM controller; and a 2D compensation parameter circuit, connected to the 3D compensation parameter circuit and the compensation pin of the PWM controller; and a converter, connected to a direct current power, the PWM controller, the 2D parameter circuit and an anode of the LED array, to convert the direct current power into voltage suitable to drive the LED array under control of PWM signals;

wherein the PWM controller outputs the PWM signals according to inputs of the oscillation pin, the compensation pin and the current detect pin;

wherein the 3D frequency parameter circuit comprises:

a first resistor, having one end connected to the microcontroller;

a second resistor, connected between the other end of the first resistor and ground;

a first transistor, comprising a base connected to the other end of the first resistor, an emitter connected to the ground, and a collector;

a third resistor, connected between a reference voltage power and the collector of the first transistor;

a second transistor, comprising a gate connected to the collector of the first transistor, a source connected to the reference voltage power, and a drain; and a fourth resistor, having one end connected to the drain of the second transistor and the other end connected to the PWM controller.

10. The display device of claim 9, wherein the LED driving system further comprises a current balance circuit connected to the PWM controller and a cathode of the LED array, to balance current through the LED array.

11. The display device of claim 9, wherein the 2D frequency parameter circuit comprises:

a fifth resistor, having one end connected to the reference voltage power and the other end connected to PWM controller together with the other end of the fourth resistor; and a first capacitor, connected between the other end of the fifth resistor and the ground.

12. The display device of claim 11, wherein the 2D frequency parameter circuit further comprises:

at least one sixth resistor, having one end connected to the PWM controller together with the other end of the fourth resistor; and at least one solder pad, connected between the reference voltage power and the other end of the sixth resistor.

13. The display device of claim 9, wherein the 3D current detection parameter circuit comprises:

a seventh resistor, having one end connected to the microcontroller;

an eighth resistor, connected between the other end of the seventh resistor and the ground;

a third transistor, comprising a collector, a base connected to the other end of the seventh resistor, and an emitter grounded; and a ninth resistor, having one end connected to the collector of the third transistor.

14. The display device of claim 13, wherein the 2D current detection parameter circuit comprises:

a tenth resistor, connected between the other end of the ninth resistor and the PWM controller;

a second capacitor, connected between a junction of the tenth resistor and the PWM controller and the ground;

an eleventh resistor, having one end grounded and the other end connected to the other end of the ninth resistor;

a twelfth resistor, having one end grounded and the other end connected to the converter; and a first diode, having a cathode connected to the other end of the eleventh resistor, and an anode connected to the other end of the twelfth resistor.

15. The display device of claim 9, wherein the 3D compensation parameter circuit comprises:

a thirteenth resistor, having one end connected to the microcontroller;

a fourteenth resistor, connected between the other end of the thirteenth resistor and the ground;

a fourth transistor, comprising a collector, a base connected to the other end of the thirteenth resistor, and an emitter grounded; and a fifteenth resistor, having one end connected to the collector of the fourth transistor.

16. The display device of claim 15, wherein the 2D compensation parameter circuit comprises:

a third capacitor, having one end connected to the PWM controller and the other end connected to the other end of the fifteenth resistor; and a sixteenth resistor, connected between the other end of the third capacitor and the ground.

17. A light emitting diode (LED) driving system, to drive an LED array of a display device comprising a display panel and a panel driver, the LED driving system comprising:

a microcontroller, connected to the panel driver to output a first signal when the display device is in a 3D mode, and to output a second signal when the display device is in a two dimension (2D) mode;

a 3D parameter circuit, connected to the microcontroller to output a 3D parameter control signal upon receiving the first signal, and to stop outputting the 3D parameter control signal upon receiving the second signal;

a 2D parameter circuit, connected to the 3D parameter circuit to generate and output a 2D parameter control signal according to output of the 3D parameter circuit;

a pulse width modulator (PWM) controller, to output PWM signals according to outputs of the 2D parameter circuit and the 3D parameter circuit; and a converter, connected to a direct current power, the PWM controller, the 2D parameter circuit and an anode of the LED array, to convert the direct current power into voltage suitable to drive the LED array under control of the PWM signals;

wherein the 2D parameter circuit comprises a 2D frequency parameter circuit, a 2D current detection parameter circuit and a 2D compensation parameter circuit, and the 3D parameter circuit comprises a 3D frequency parameter circuit, a 3D current detection parameter circuit and a 3D compensation parameter circuit;

wherein the 3D frequency parameter circuit comprises: a first resistor, having one end connected to the microcontroller;

a second resistor, connected between the other end of the first resistor and ground;

a first transistor, comprising a base connected to the other end of the first resistor, an emitter connected to the ground, and a collector;

a third resistor, connected between a reference voltage power and the collector of the first transistor;

a second transistor, comprising a gate connected to the collector of the first transistor, a source connected to the reference voltage power, and a drain;

and a fourth resistor, having one end connected to the drain of the second transistor and the other end connected to the PWM controller.

18. A display device, comprising:

a display panel capable of display in a two dimension (2D) mode or a three dimension (3D) mode;

a panel driver, to drive the display panel to display video content in the 2D mode or the 3D mode;

a light emitting diode (LED) array; and an LED driving system, to drive the LED array, the LED driving system comprising:

a microcontroller, connected to the panel driver to output a first signal when the display device is in the 3D mode, and to output a second signal when the display device is in the 2D mode;

a 3D parameter circuit, connected to the microcontroller to output a 3D parameter control signal upon receiving the first signal, and to stop outputting the 3D parameter control signal upon receiving the second signal;

a 2D parameter circuit, connected to the 3D parameter circuit to generate and output a 2D parameter control signal according to output of the 3D parameter circuit;

a pulse width modulator (PWM) controller, to output PWM signals according to outputs of the 2D parameter circuit and the 3D parameter circuit; and    a converter, connected to a direct current power, the PWM controller, the 2D parameter circuit and an anode of the LED array, to convert the direct current power into voltage suitable to drive the LED array under control of the PWM signals;

wherein the 2D parameter circuit comprises a 2D frequency parameter circuit, a 2D current detection parameter circuit and a 2D compensation parameter circuit, and the 3D parameter circuit comprises a 3D frequency parameter circuit, a 3D current detection parameter circuit and a 3D compensation parameter circuit;

wherein the 3D frequency parameter circuit comprises:

a first resistor, having one end connected to the microcontroller;

a second resistor, connected between the other end of the first resistor and ground;

a first transistor, comprising a base connected to the other end of the first resistor, an emitter connected to the ground, and a collector;

a third resistor, connected between a reference voltage power and the collector of the first transistor;

a second transistor, comprising a gate connected to the collector of the first transistor, a source connected to the reference voltage power, and a drain;

and a fourth resistor, having one end connected to the drain of the second transistor and the other end connected to the PWM controller.

\* \* \* \* \*